Patented Apr. 18, 1950

2,504,930

UNITED STATES PATENT OFFICE 2,504,930

POLYVINYL CHLORIDE RESIN PLASTICIZED WITH 1,5-PENTANEDIOL DIFUROATE

Stanford J. Hetzel, Cheltenham, Pa., assignor to Sun Oil Company, Philadelphia, Pa., a corporation of New Jersey No Drawing. Application August 25, 1948, Serial No. 46,188

2 Claims. (Cl. 260—30.4)

The present invention relates to a plasticized polyvinyl resin. Specifically it relates to a polyvinyl chloride resin in plasticized composition with 1,5-pentanediol difuroate.

In copending application for patent Serial No. 46,183, filed by the instant inventor, August 25, 1948, the foregoing ester and its method of preparation are described and claimed. According to that application the ester was prepared by refluxing in the presence of a trace of an acid catalyst 1,5-pentanediol with approximately stoichiometric quantities of furoic acid in the presence of a solvent. The ester is there described as a colorless to pale amber oil-like material having a boiling point at 4 mm. Hg of about 240° C.-260° C., a refractive index $N_D^{20°\,C.}$ 1.5118, a density $D_4^{20°\,C.}$ 1.189 and a melting point of about 12° C.-15° C.

According to the present invention polyvinyl chloride or polyvinyl chloride in admixture with polyvinyl acetate is compounded with the foregoing ester according to the practice usual in the art.

The following example illustrates the invention:

Example

A commercial polyvinyl resin (76.05 grams), known as Geon 101 and composed mainly or wholly of polyvinyl chloride, was mixed together with lead carbonate (1.24 grams) and stearic acid (0.59 grams) in the dry state by ball milling. Fifty-two grams of the plasticizer product of the invention was added in a cake mixer and the mass stirred thoroughly until good mixing was obtained. This mass was then fused on a 3" x 8" rubber mill whose rolls were heated to a temperature of about 285° F. The banded material was cut several times from each side and sheeted off at about 0.030 inch to give a rough sheet of about 0.070 inch when cooled. Part of this sheet was remilled to give a thin sheet of about 0.010 inch. Milling times were about 6 minutes to 2 minutes respectively. This thin sheet (0.010") furnished material for volatility and water extraction tests. After five minutes preheating at 160° C. the rough sheet was molded for 10 minutes at 1500 lbs./sq. in. in a 5¾" square steel mold to give a smooth sheet about 0.045" thick. This sheet (0.045") furnished material for tensile strength, modulus, elongation, brittle point, heat stability and Shore hardness tests. Test results were as follows:

Volatility (weight loss at 100° C.—3
  hours) _____percent__ 0.14
Water extraction (weight loss in water after
  10 days at room temperature) __percent__ 2.33
Tensile strength (Scott—ASTM
  D412-41) _____lbs./sq. in.__ 2220
Modulus at 300% elongation___lbs./sq. in.___ 2040
Elongation _____percent__ 335
Brittle point _____°C__ —50
Heat stability (time for color change at
  160° C.) _____hours__ 2
Shore hardness _____ 70

I claim:
1. A process of plasticizing a polyvinyl chloride resin which comprises the step of milling together said resin with 1,5-pentanediol difuroate as plasticizer.
2. A composition comprising a polyvinyl chloride resin plasticized with 1,5-pentanediol difuroate.

STANFORD J. HETZEL.

REFERENCES CITED

The following references are of record in the file of this patent:

UNITED STATES PATENTS

| Number | Name | Date |
| --- | --- | --- |
| 2,017,070 | Lazier | Oct. 15, 1935 |